United States Patent [19]

Kerns et al.

[11] 4,148,089
[45] Apr. 3, 1979

[54] VOLTAGE SURGE PROTECTOR

[75] Inventors: Becky T. Kerns, Summit; Walter Logan, Somerset; Lee G. McKnight, Morristown; Frederick W. Ostermayer, Jr., Chatham; Milton E. Terry, Mountainside, all of N.J.

[73] Assignee: Bell Telephone Laboratories, Incorporated, Murray Hill, N.J.

[21] Appl. No.: 863,465

[22] Filed: Dec. 22, 1977

[51] Int. Cl.² .............................................. H02H 3/22
[52] U.S. Cl. ................................. 361/119; 313/214; 313/217; 313/311; 313/325; 361/129
[58] Field of Search ............... 361/119, 120, 117, 118, 361/127, 128, 129, 126; 313/208, 214, 217, 218, 306, 325, 311

[56] References Cited

U.S. PATENT DOCUMENTS

| 2,923,849 | 2/1960 | Rees | 313/325 X |
|---|---|---|---|
| 3,119,040 | 1/1964 | Gardiner et al. | 313/214 |
| 3,252,038 | 5/1966 | Calvesbert et al. | 361/117 X |
| 3,454,811 | 7/1969 | Scudner, Jr. | 361/120 X |
| 3,703,665 | 11/1972 | Yereance et al. | 361/129 X |
| 3,898,533 | 8/1975 | Scudner Jr. | 361/120 |
| 4,002,952 | 1/1977 | Menninga | 361/120 X |
| 4,020,398 | 4/1977 | McKnight | 361/127 |
| 4,037,266 | 7/1977 | English et al. | 361/120 |

Primary Examiner—Patrick R. Salce
Attorney, Agent, or Firm—Allen N. Friedman

[57] ABSTRACT

Much electrical equipment, such as telephone station apparatus, exposed to occasional, destructively high, voltage surges (e.g., lightning strikes) is protected by a device, placed in parallel with the equipment. This device includes two electrodes defining a fixed narrow spark gap. Such a device is designed to arc over with each surge, shorting the destructive energy to ground, and to recover afterward, restoring the line to its original condition. The predominant failure mode of such devices is the occurrence of a permanant short across the narrow gap, due to electrode damage produced during the protective arcing mode. In the disclosed devices, the electrodes bound an annular narrow gap region, determining the protective breakdown voltage, and a central wider gap region, sustaining the major part of the electrode damage. Shortly after the initiation of the protective discharge in the narrow gap region, the discharge is forced into the wider gap region by the provision, in at least one of the electrodes, of a high resistance carbonaceous material at the annular narrow gap region and a lower resistance metallic material at the central wider gap region. Since the major portion of electrode damage is sustained by the wider gap region of the electrodes, the incidence of shorting failure is suppressed.

13 Claims, 3 Drawing Figures

VOLTAGE SURGE PROTECTOR

BACKGROUND OF THE INVENTION

1. Field of the Invention

The invention is in the field of voltage surge protection devices, such as are used to protect telephone station apparatus from external voltage surges (e.g., lightning strikes and accidental contact between telephone lines and power lines).

2. Description of the Prior Art

In transmission systems with large stretches of outdoor wiring, it is common to protect terminal equipment from voltage surges (e.g., lightning strikes) by the inclusion of a protective device between the line and ground at each terminal. Such devices should be capable of sustaining repeated voltage surges without failing but when they fail, they should fail to an electrically short circuit condition (fail safe). A widely used class of surge protective devices includes two carbon block electrodes with parallel faces defining an air gap of the order of 0.1 millimeter. This is an extremely inexpensive device, however, the labor cost of replacing failed devices in the field is high. Thus, efforts have been continuously made to extend the service life of such devices, even at the expense of somewhat higher cost. One modification which has been developed is the inclusion of grooves in the carbon block face to accept debris formed during the protective breakdown. (U.S. Pat. No. 3,703,665 issued Nov. 21, 1972.) Another class of devices seeks to prolong service life through the use of carbon-coated metal electrodes sealed in a protective environment. Such devices have been made with setbacks in the electrodes to suppress failure produced by the sputtering of conductive material during breakdown (see, for example, U.S. Pat. No. 3,898,533 issued Aug. 5, 1975). These sealed devices are significantly more expensive than carbon block devices. However, when the factors such as the labor cost for replacement of failed devices is taken into account, their use is often indicated. A metal electrode protector with protrusions in the gap faces to avoid pitting is disclosed in U.S. Pat. No. 3,119,040 issued Jan. 21, 1964 and a protector with metal electrodes with a central portion of a high resistance (megohms) semiconductor material (e.g., silicon carbide) is disclosed in U.S. Pat. No. 2,923,849, issued Feb. 1, 1960.

In a recently developed approach to this problem (U.S. Pat. No. 4,020,398 issued Apr. 26, 1977 to L. G. McKnight), the electrodes bound a narrow gap region, to set the protective breakdown voltage, and a wider gap region, which will sustain the major part of the electrode damage. Shortly after the initiation of the protective discharge in the narrow gap region, the discharge is forced into the wider gap region by the provision, in at least one of the electrodes, of a high resistance path at the narrow gap region. Since the major portion of electrode damage is sustained by the wider gap region of the electrodes, the incidence of shorting failure is suppressed.

For use in many situations it is a further requirement placed on these devices, that they be capable of maintaining repeated low current or low energy surges without failing "open" by erosion of the material at the narrow gap region, producing an unacceptably high breakdown voltage. The particular electrode geometries disclosed in U.S. Pat. No. 4,020,398 showed some tendency toward this fault, leading to a search for an improved electrode structure.

SUMMARY OF THE INVENTION

A surge protector of novel electrode structure has been developed which sustains repeated high-current high energy surges for a long service life, while possessing a reduced susceptibility to "open" failure produced by repeated low energy surges. At least one of the electrodes includes a toroid of a higher resistivity predominantly carbonaceous material and a lower resistivity central post. The protective gap between the electrodes possesses a narrow region and a wider region. The toroid and central post are positioned such that the narrow region of the gap is situated where the toroid faces the opposite electrode and the wider region of the gap is situated where the central post faces the opposite electrode. In an exemplary embodiment a flange is provided on the central post to fix the relative position of the post and the toroid.

In this novel device the toroid is made of a higher resistivity material than the central post. While the protective arc forms in the narrow region of the gap, as the discharge current increases the arc transfers to the wider region of the gap because of the higher resistance in the current path through the toroid. The current at which arc transfer takes place tends to increase with an increase in the radial extent of the narrow gap region. The susceptibility to "open" failure increases with decreasing area of the narrow region of the gap. The annular narrow gap region of this improved electrode geometry permits the area of the narrow gap region to be increased (providing longer low-current-surge life) while keeping the radial extent of the narrow gap region limited so as to produce arc transfer at the desired current. In exemplary devices with a narrow gap width of 70 micrometers, a radial extent of 0.7 millimeters resulted in arc transfer currents of approximately 30 amperes. It has also been found that the use of an irregular electrode surface reduced the tendency for damage to the toroid surface to be localized. In comparative experiments this served to improve device life. An exemplary geometry also has the feature that any misassembly results in an equal or lower protection voltage (a fail-safe feature).

DETAILED DESCRIPTION

1. The Device

Figure 1:
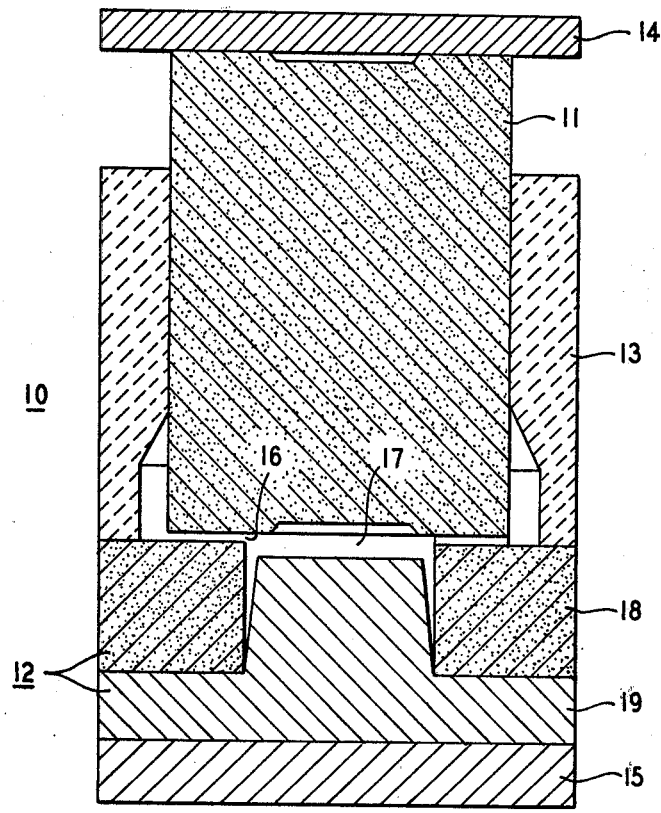
FIG. 1 is an elevational view in section of an exemplary surge protector of the invention.

FIG. 1 shows, partly in schematic form, the basic elements of an exemplary surge protector of the invention. The two electrodes 11,12 are held in a predetermined fixed relation to one another by an insulator 13 and are connected across the device being protected, through the metal contacts 14,15. The electrodes 11,12 define a narrow gap region 16 and a wider gap region 17. During the normal operation of the transmission system in which the surge protector is incorporated, the voltage across the device 10 is much less than is required to produce gaseous ionization in the gap 16,17. During abnormally high voltage surges, the large electric field in the narrow gap region 16 produces ionization of the gas and a gaseous plasma discharge (arc). Once this discharge has been formed, the surge protector appears as a low resistance path to ground, protecting the terminal device across which it is connected. Discharges of this sort produce a great deal of thermal and ion bombardment damage to the electrodes.

The most common failure mode of such a device is the occurrence of a short circuit across the gap due to the above-mentioned electrode damage (typical gap spacings are of the order 0.1 millimeter). In the device of the invention, the discharge is forced from the narrow gap region 16 into the wider gap region 17 as the current through the device increases. Thus, much of the electrode damage takes place in the wider gap region 17 making this device much less susceptible to shorting failure. This arc transfer is produced by the provision of a higher resistance in the path through at least one electrode in the narrow gap region 16 than in the wider gap region 17. Thus, at high currents a voltage drop is produced across the adjacent wide gap, triggering an arc across the wide gap. This, then becomes the lower resistance path and the arc in the narrow gap is extinguished.

In the device of FIG. 1 the upper electrode 11 is a single piece of a predominantly carbonaceous material and is provided with a metallic contact 14 to the external circuitry. This contact 14 is shown schematically, a large number of embodiments of this element being known in the art. The upper electrode 11 is held by an insulating housing 13 in space relationship with the lower electrode 12. This lower electrode 12 is a composite consisting of a toroid of rectangular cross section 18, composed of a predominantly carbonaceous material, and a central flanged metal post 19. The operation region of the device 10 is the space between the upper electrode 11 and lower electrode 12. This includes a narrow region 16 formed by the upper electrode 11 and the toroid 18 and a wider region 17 formed between the upper electrode 11 and the central post 19. The toroid 18 is made of a higher resistivity material than the central post 19 so that, during discharge, the electrical resistance between the external contact 15 and the narrow gap region 16 is larger than the electrical resistance between the external contact 15 and the wider region of the gap 17. It is the operating principle of the device that, as the current through the device becomes larger, the larger voltage drop through the higher resistivity material of the toroid 18 drives the arc from the narrow region 16 into the wider region of the gap 17. A significant portion of this higher resistance is due to the phenomenon known as "spreading resistance" due to the localized nature of the arc at the surface of the high resistivity material. Thus, for the high current surges the major portion of the electrode damage takes place in the wider region of the gap 17, suppressing the incidence of shorting failure. Since this decrease of sensitivity to electrode damage is dependent upon the relative spacing of the narrow 16 and wider 17 portions of the gap, it is preferred that the wide gap region 17 be at least 100 percent wider than the narrow region of the gap 16. A wide gap region more than three times as wide as the narrow region provides an even greater degree of improvement. However, if the wide gap region is more than a half millimeter wide, arc transfer tends to be inhibited.

It has been found that the current at which arc transfer from the narrow region 16 to the wider region 17 takes place depends on the radial extent of the narrow gap region 16. In the structure of FIG. 1 it is the overlap between the toroid 18 and the upper electrode 11 which forms this narrow gap region so that the radial extent of the narrow gap region 16 can be selected by selecting the diameter of the upper electrode 11 and the diameter of the central hole of the toroid 18. It has been found that the greater the radial extent of the narrow gap portion 16, the higher is the average current at which arc transfer takes place, thus, producing a greater chance of shorting failure due to electrode damage.

Figure 2:
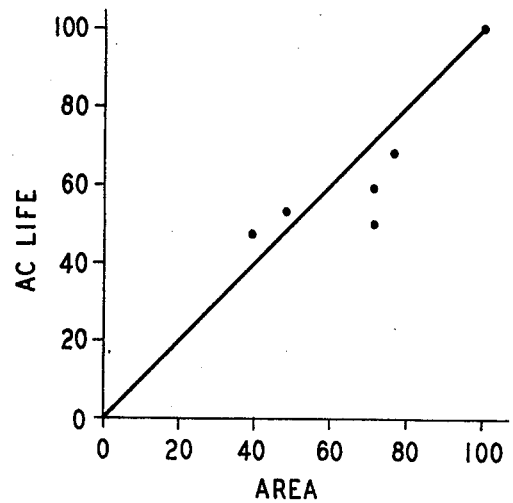
FIG. 2 is a data plot of normalized device life (ordinate) as a function of normalized area (abscissa) for devices subject to repeated low current discharges.

In selecting the radial extent of the narrow gap 16 another effect must be taken into account. Some situations, for example, inductive pick up from power lines brought accidentally in proximity with telephone lines, produce repeated low-energy discharges in the protector device 10. These low-energy discharges tend to produce gradual erosion of the carbonaceous electrode surface, causing the gap 16 to widen and increasing the protection voltage (i.e., the voltage above which a discharge forms). When an unacceptably high protection voltage is reached the device is considered to have failed in the "open failure" mode (i.e., "fail open"). FIG. 2 shows the results of some experimental measurements on devices with various areas of overlap. The ordinate is normalized to the longest lived device tested and the abscissa is normalized to the area of that device. The measured data shows a general tendency for larger area devices to be longer lived when subjected to repeated one ampere discharges.

The use in the devices of this invention, of a toroid 18 of high resistivity material as opposed to a central post of high resistivity material disclosed in U.S. Pat. No. 4,020,398 issued Apr. 26, 1977, enables the designer to increase the area of overlap without increasing the radial extent of the narrow gap region, by appropriate selection of the relative diameter of the central hole of the toroid 18 and the diameter of the upper electrode 11. Thus, a device of this invention can be fabricated with a longer low-energy-discharge life together with a lower discharge-transfer current than with the geometry of the above-mentioned patent, using the same materials.

The toroid 18 of FIG. 1 is of rectangular cross section, however, the shape of the toroid 18 and upper electrode 11 can be otherwise selected so long as they, together, provide a narrow gap region 16 of approximately uniform width. The use of a carbonaceous material for the toroid 18 and upper electrode 11 is preferred because of the volatility of the combustion products of carbon. However, other materials may be useful in satisfying other device requirements. The necessary requirement is, however, that the resistivity of the toroid material be higher than the resistivity of the material of the central post 19. It is preferred that the resistance between the external contact 15 and the narrow portion of the gap 16 be less than 1000 ohms in order for the device to be compatible with common telephone company defect clearing voltages. In order to produce effective arc transfer, the resistivity of the toroid 18 should be at least 0.5 ohm-centimeters. The resistivity of the central post material should be less than 0.005 ohm-centimeters.

Exemplary Materials

A predominantly carbonaceous material suitable for use in fabricating the toroid element of the inventive surge protector device can be made from a mixture of carbon black (e.g., lamp black), powdered coke, and a coal tar pitch binder. Following common carbon technology these materials are blended together and pressed into the desired toroidal form, with suitable allowance for the commonly observed degree of shrinkage during firing. A suitable firing cycle has been developed, which consists of baking the pressed toroid elements in an oxidizing atmosphere (e.g., air) at a temperature from 300° C. to 475° C. for at least one-half hour. A subsequent firing for more than half an hour in a reducing atmosphere at temperatures from 475° C. to 650° C. is often beneficial. This firing cycle is selected to produce a final material resistivity in the range of 1 ohm-centimeter to 3 ohm-centimeters. The center post is made of a material with a resistivity less than 0.005 ohm-centimeters. For ease of fabrication and assembly the center post material is a metal. It may be another low resistivity material, such as carbon fired at higher temperatures than the above-mentioned material.

The center post may be made, for example, of copper or nickel. Tests indicated (See FIG. 3) that such units performed well with current pulses from 5 to 1000 amperes when the copper electrode was on the electrically negative side of the discharge. However, when the copper electrode was on the positive side of the discharge a tendency toward major disruption of the copper surface was observed at current levels of 100 amperes and above. It is believed that this is due to higher energy flux of the electron bombardment. In such situations the use of a more refractory metal, such as tungsten, is indicated. Exemplary units in which the metal post was made of a 30 percent copper-70 percent tungsten sintered powder material, performed satisfactorily. The metal post can be a composite with the refractory metal only at the gap defining surface of the post. The refractory metal should have a melting point above 1800° C. (e.g., tungsten and molybdenum). Metallic compounds and alloys, such as tungsten carbide, are useful, as are the sintered products of powder metallurgy, such as the above-mentioned copper-tungsten combination.

In order to keep the arc transfer current below the range where inordinately large damage occurs within the narrow gap region, the radial extent of the narrow gap region should be less than 1 millimeter. For use in conjunction with telephone terminal and plant equipment, the radial extent of the narrow gap region should be from 0.6 to 0.8 millimeters. Within these limits the arc transfer current is low enough and the resistance to "open" failure is high enough for effective protection.

It has been found that if a roughened surface is provided on a gap defining surfaces, successive arcs are less likely to recur at the same spot within the narrow gap region providing an improved lifetime. It is believed that this results from the fact that the initial roughness masks damage produced by previous arcs. The maximum depth of the irregularities should be less than the width of the gap as defined by the peaks. This is desirable to limit electrode erosion caused by repeated low energy breakdowns. Such erosion tends to produce an increase in the protection voltage (i.e., the voltage above which a discharge forms). Too much erosion produces the conditon of "open" failure. The production of these irregularities by pressing them into the unfired carbon material is preferable to roughening a smooth material after firing because of the better surface integrity produced by the former procedure. In an exemplary device the irregular surface can be qualitatively described having a pebbly or stippled appearance. The surface had a peak-to-peak spacing approximately 5 times the average height of the irregularities.

Examples

Figure 3:
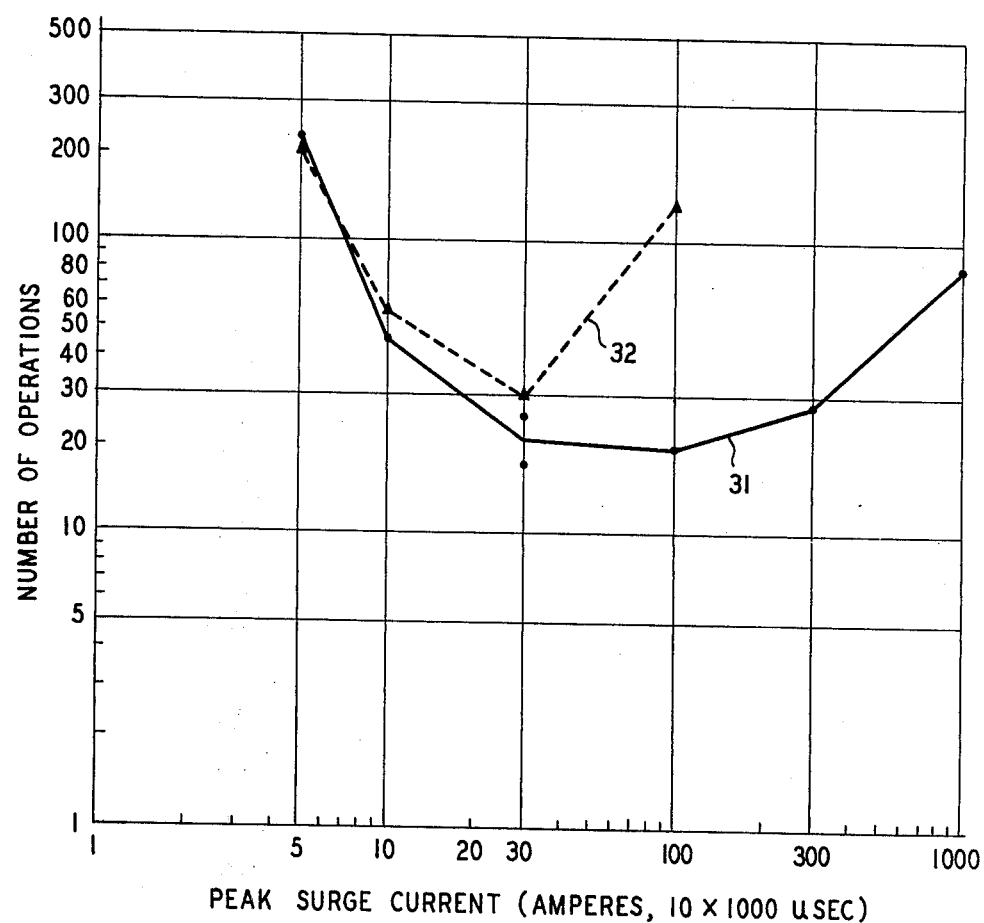
FIG. 3 is a data plot of number of discharges before failure (ordinate) as a function of peak surge current (abscissa) for devices of the invention and prior art devices.

FIG. 3 indicates the results of a large number of tests of devices constructed in accordance with the invention as compared with similar tests performed on prior art devices. The inventive devices were constructed as indicated in FIG. 1. In these devices the diameter of the upper electrode 11 was 5.7 millimeters. The toroid had an inner diameter of 4.2 millimeters and an outer diameter of 7.9 millimeters. The insulating housing 13 held the upper electrode 11 relatively to the toroid 18 with a spacing of 0.64 millimeters, forming the narrow gap region with a radial extent of 0.74 millimeters. The central post 19 was made of copper and possessed a flange extending under the toroid thus fixing its position relative to the toroid 18. The width of the wide gap 17 was 0.3 millimeters.

The material of the toroid elements was produced by mixing 14 weight percent lamp black, 51 weight percent 200 mesh petroleum coke and 35 percent coal tar pitch. The pitch had a specific gravity from 1.34 to 1.24 and a softening point from 97° C. to 103° C. These materials were mixed together in an Abbe pebble mill and pressed into final form to a density of 1.40 grams per cubic centimeter. The elements were placed in an oven with an air atmosphere and baked at 350° C. for one-half hour and then at 450° C. for one-half hour. They were then placed in a closed muffle with an equivalent weight of scrap carbon and baked in a reducing atmosphere at 600° C. for 1 hour. 200 units were tested with repeated current pulses at six selected current levels from 5 to 1000 amperes. The current pulses had a 10 microsecond rise time and a 1000 microsecond decay time. The upper elements 11 were made of a prior art electrode carbon with a resistivity of 0.003 ohm-centimeters. The pistons which produced the gap forming surfaces of the upper electrode 11 elements were provided with a pebbly surface finish with a peak-to-valley roughness of approximately 25 micrometers and a peak-to-peak spacing of approximately 100 micrometers. The starting materials were the same as in the toroid element but the firing temperature was higher. The comparison prior art test units were made with both electrodes of this same prior art material. Approximately 30 devices of the invention and 30 prior art devices were tested in each current level. For all discharges, except for one set at 30 amperes, the inventive composite electrode was on the negative side of the protective device. The test results are indicated in FIG. 3. The lower curve 31 indicates the median number of operations to failure of prior art elements and the upper curve 32 indicates the median number of operations to failure of the inventive device. These test results indicate significantly longer device life for current pulses above 30 amperes. It is considered that this is the result of arc transfer above 30 amperes from the narrow region of the gap to the wider region of the gap.

What is claimed is:

1. An overvoltage surge protector comprising a first electrode, a second electrode and a housing including means for maintaining the first electrode and the second electrode in spaced relationship to one another and electrically insulated from one another, the said electrodes each possessing a broad face and an external contact area, the broad face of said electrodes defining a gap therebetween, the gap so defined including at least a narrow portion and a contiguous wider portion wherein at least the said first electrode possesses a higher electrical resistance from the external contact area to the narrow portion of the gap than its electrical resistance from the external contact area to the wider portion of the gap CHARACTERIZED IN THAT at least the said first electrode consists essentially of a toroid of a predominantly carbonaceous material defining the narrow portion of the gap and a metal post defining the wider portion of the gap, within the central aperture of the toroid.

2. A device of claim 1 in which the resistivity of the carbonaceous material is at least 0.5 ohm-centimeters and the resistivity of the post is at most 0.005 ohm-centimeters.

3. A device of claim 2 in which the radial extent of the narrow gap region is less than 1 millimeter.

4. A device of claim 3 in which the radial extent of the narrow gap region is from 0.6 millimeters to 0.8 millimeters.

5. A device of claim 1 in which the wider portion of the gap is at least 100 percent wider than the narrow portion of the gap.

6. A device of claim 1 in which the metal post includes a flange extending radially under the toroid, whereby registry between the upper surface of the post and the upper surface of the toroid is maintained.

7. A device of claim 1 in which the carbonaceous material consists essentially of a baked mixture of lamp black and powdered petroleum coke with a coal tar pitch binder.

8. A device of claim 7 in which the mixture is (a) pressed to form a toroid; (b) baked in an oxidizing atmosphere at a temperature from 300° C. to 475° C. for at least one-half hour; and (c) baked in a reducing atmosphere at a temperature from 475° C. to 650° C. for at least one-half hour.

9. A device of claim 8 in which at least one pressed electrode, before baking, is caused to possess, at the gap defining surface, irregularities of a maximum height less than the gap width.

10. A device of claim 1 in which the metal post includes a body of a refractory metal with a melting point greater than 1800° C., at the gap defining surface of the metal post.

11. A device of claim 10 in which the refractory metal includes tungsten.

12. A device of claim 11 in which the refractory metal also includes copper.

13. A device of claim 1 in which the metal post is copper.

* * * * *